(12) United States Patent
Veselov et al.

(10) Patent No.: US 10,623,433 B1
(45) Date of Patent: Apr. 14, 2020

(54) CONFIGURABLE EVENT-BASED COMPUTE INSTANCE SECURITY ASSESSMENTS

(71) Applicant: Amazon Technologies, Inc., Seattle, WA (US)

(72) Inventors: Vladimir Veselov, Ashburn, VA (US); Adrian-Radu Grajdeanu, Great Falls, VA (US); James Fink, Potomac Falls, VA (US); Robert Eric Fitzgerald, Aldie, VA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 15/714,315

(22) Filed: Sep. 25, 2017

(51) Int. Cl.
*H04L 29/06* (2006.01)
*G06F 9/455* (2018.01)
*H04L 29/08* (2006.01)

(52) U.S. Cl.
CPC ...... *H04L 63/1433* (2013.01); *G06F 9/45558* (2013.01); *G06F 9/45541* (2013.01); *G06F 9/45545* (2013.01); *G06F 2009/45595* (2013.01); *H04L 67/10* (2013.01)

(58) Field of Classification Search
CPC . H04L 63/1433; H04L 67/10; G06F 9/45558; G06F 2009/45595; G06F 9/45541; G06F 9/45545
See application file for complete search history.

(56) References Cited

U.S. PATENT DOCUMENTS

| 8,745,734 | B1 * | 6/2014 | Brandwine | H04L 63/1408 |
| | | | | 726/22 |
| 8,918,785 | B1 * | 12/2014 | Brandwine | G06F 9/45558 |
| | | | | 718/1 |
| 9,112,895 | B1 * | 8/2015 | Lin | H04L 63/1416 |
| 9,462,010 | B1 * | 10/2016 | Stevenson | H04L 63/1433 |
| 9,762,604 | B2 * | 9/2017 | Zaw | H04L 63/1433 |
| 2005/0216764 | A1 * | 9/2005 | Norton | G06F 21/577 |
| | | | | 726/5 |
| 2007/0143851 | A1 * | 6/2007 | Nicodemus | G06F 11/3495 |
| | | | | 726/25 |

(Continued)

OTHER PUBLICATIONS

Montanari et al., "Multi-Aspect Security Configuration Assessment", Nov. 2009, ACM, pp. 1-5. (Year: 2009).*

(Continued)

*Primary Examiner* — Matthew Smithers
(74) *Attorney, Agent, or Firm* — Nicholson De Vos Webster & Elliott

(57) ABSTRACT

Techniques for configurable event-based compute instance security assessments are described. A security assessment service receives one or more configuration messages, sent on behalf of a user, indicating a request to perform a security assessment of one or more computing resources managed by a service provider system responsive to any of one or more events being determined to have occurred. The security assessment is to include attempting to identify security vulnerabilities of the one or more computing resources. The security assessment service determines that an event of the one or more events has occurred subsequent to event data being reported that is indicative of the event, and performs the security assessment of the one or more computing resources responsive to the determining that the event has occurred.

17 Claims, 11 Drawing Sheets

(56) References Cited

U.S. PATENT DOCUMENTS

| | | | | |
|---|---|---|---|---|
| 2011/0055925 A1* | 3/2011 | Jakobsson | ............ | G06F 21/552 |
| | | | | 726/25 |
| 2014/0201843 A1* | 7/2014 | Hibbert | ............... | H04L 63/1433 |
| | | | | 726/25 |
| 2017/0324758 A1* | 11/2017 | Hart | .................... | H04L 63/1408 |
| 2018/0124072 A1* | 5/2018 | Hamdi | ................. | G06F 21/577 |
| 2018/0124079 A1* | 5/2018 | Ahuja | ................. | H04L 63/1425 |
| 2018/0288078 A1* | 10/2018 | Balasundaram | .... | H04L 63/1408 |
| 2018/0367561 A1* | 12/2018 | Givental | ............. | H04L 63/1433 |

OTHER PUBLICATIONS

Barrere et al., "Vulnerability Assessment in Autonomic Networks and Services: A Survey", 2014, IEEE Communications Surveys & Tutorials, vol. 16, No. 2, pp. 988-1004. (Year: 2014).*
Final Office Action from U.S. Appl. No. 13/997,837, dated Mar. 22, 2019, 27 pages.

* cited by examiner

CONFIGURABLE EVENT-BASED COMPUTE INSTANCE SECURITY ASSESSMENTS

BACKGROUND

As an increasing number of applications and services are being made available over networks such as the Internet, an increasing number of content, application, and/or service providers are turning to technologies such as Web services. Web services, in general, represent an approach to providing access to electronic resources through services where the hardware and/or software used to provide those services is dynamically scalable to meet the needs of the services at any given time. A user or customer often will rent, lease, or otherwise pay for access to resources provided in a service provider's system, and thus does not have to purchase and maintain the underlying hardware and/or software.

In this context, many Web services providers utilize virtualization and multi-tenant architectures to allow multiple users to share its underlying hardware and/or software resources. Virtualization allows server end stations, storage devices, or other hardware resources to be partitioned into multiple isolated instances that can be assigned to and used by different users. Thus, multiple users can utilize the Web services provider's resources at a time, increasing the number of users a service provider can support, thus reducing the management and financial costs to both the service provider and its users.

However, with the increased adoption of Web services, cyber-attacks involving these systems have similarly increased. While previously many cyber-attacks targeted on premise enterprise networks, attackers have begun shifting their focus to service provider systems, especially as these environments are target-rich due to the use of multitenancy and the possibility of misconfigurations on the part of users.

BRIEF DESCRIPTION OF DRAWINGS

Various embodiments in accordance with the present disclosure will be described with reference to the drawings, in which.

DETAILED DESCRIPTION

Figure 1:
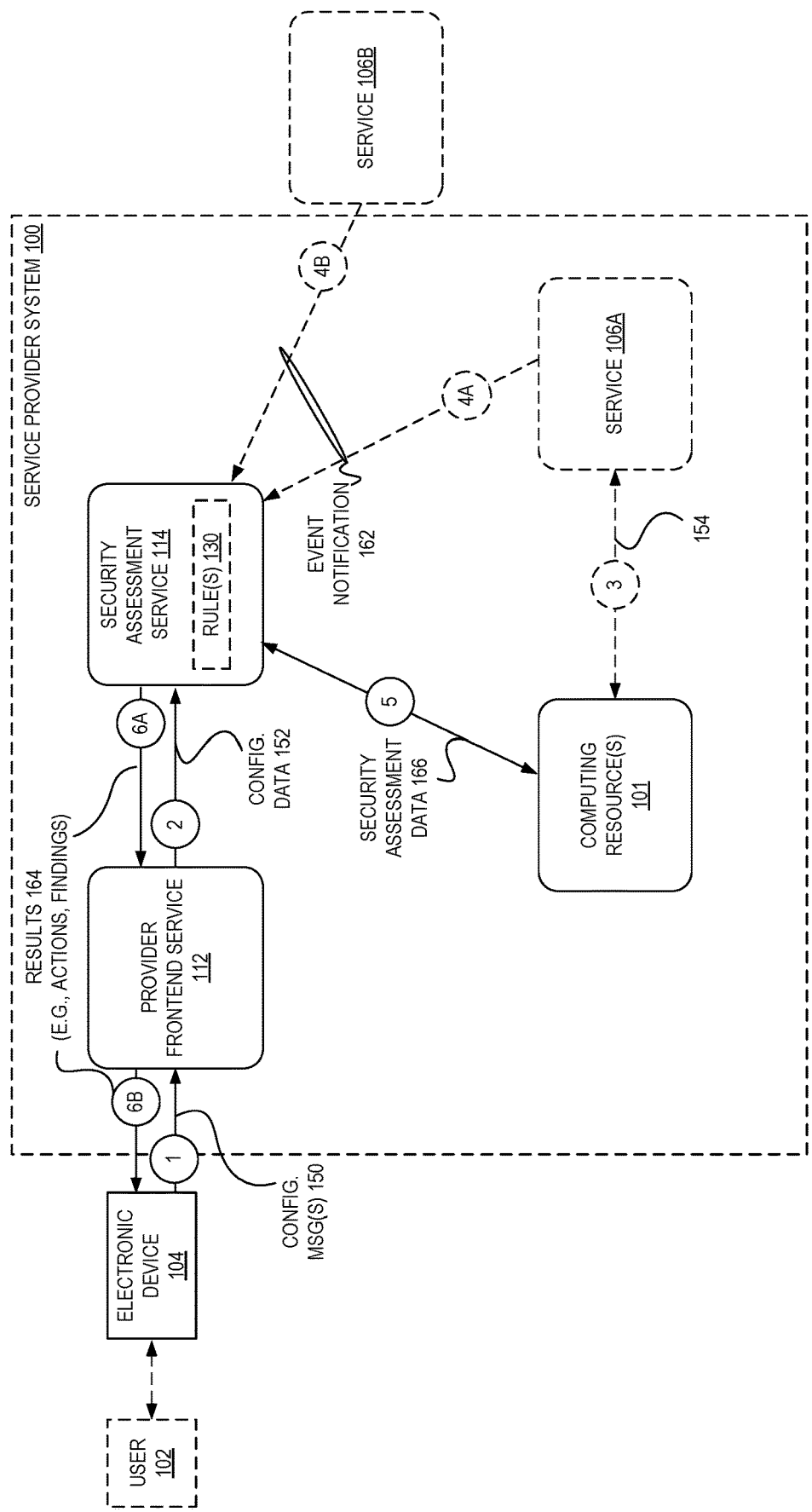
FIG. 1 is a block diagram illustrating a service provider system providing configurable event-based compute instance security assessments according to some embodiments.

Various embodiments for configurable event-based compute instance security assessment are described that perform security assessments responsive to an event. In some embodiments, a user configures a security assessment configuration for a computing resource (e.g., one or multiple compute instances) managed by a service provider system so that security assessments of the computing resource occur responsive to one or more events being detected. The user selects specific events or groupings of types of events that, when detected, trigger a security assessment of the computing resource. The events selected by a user can be specific to the computing resource (e.g., occur within the resource or by the resource), occur elsewhere in the service provider system, and/or occur outside of the service provider system.

Generally, users of service provider systems have the ability to utilize—directly or indirectly—one or more of a variety of types of computing resources. A computing resource can also be referred to as an Information Technology (IT) resource or object, and may include virtualized resources, applications, data, files, etc.

For example, service provider systems may allow its users to use computing resources such as data or storage resources (e.g., object storage, block-level storage, data archival storage), networking resources (e.g., virtual networks, Content Delivery Networks (CDNs), Domain Name Service (DNS)), application resources (e.g., databases, application build/deployment services), etc.

Another type of computing resource in a service provider system may include application templates. An application template can be an object (e.g., a file or a collection of data) configured by the user to define an application (or service) that can be provisioned by the service provider system for the user. An application template can identify one or more other computing resources—such as types and numbers of compute instances, database instances, load balancers, etc.—and configurations/properties of these computing resources (e.g., network connectivity, security policies), which collectively can provide the architecture for an application/service for the user. A user may request a service provider system to implement the application template, and thus the service provider system can safely and efficiently perform all the necessary instantiation operations, configuration operations, etc.

Another type of computing resource that can be offered in a service provider system includes "compute instances"—e.g., a virtual machine (VM) instance using a guest operating system (O/S) that operates using a hypervisor that may or may not further operate on top of an underlying host O/S, a container that may or may not operate in a VM, an instance that can execute on "bare metal" hardware without an underlying hypervisor, etc. For example, a user may be able to instantiate and/or configure compute instances with any of a variety of operating systems in one or multiple geographic locations, load them with custom application code and/or data to perform desired tasks, place multiple compute instances within a virtual network to cooperatively implement a service or application, etc.

As each compute instance essentially acts the same as a traditional non-virtualized end station, compute instances may remain vulnerable to attacks just as their traditional counterparts do. Thus, a vulnerability discovered in an operating system, protocol, or application could possibly be exploited by an attacker against a compute instance. Similarly, other computing resources may similarly be vulnerable to attacks—e.g., a database instance or file server may have a vulnerability that could be exploited, an application template may identify certain computing resources (e.g., a particular VM with a particular kernel or O/S) that have a vulnerability, etc.

To protect against these and other types of attacks, a variety of security techniques have been implemented, such as the use of access controls, user and role auditing, firewalls, intrusion detection systems (IDS), advanced logging, audit trails, etc. These security techniques tend to either seek to prevent an attack from occurring or detect a known attack that is occurring (or has occurred) by identifying known malicious activity.

Another technique to improve the security of computing resources such as compute instances (and the applications using these compute instances) involves the use of a security assessment service. A security assessment service, configured with a knowledge base of rules mapped to common security best practices and vulnerability definitions, assesses computing resources such as a compute instance or an application to detect rules violations. For example, a security assessment service could scan for remote login of a "root" account being enabled, vulnerable software versions being installed, etc. The security assessment service could perform such an assessment of a target system (e.g., one or more compute instances, one or more virtual networks, and/or other resources that may be associated with a user within the service provider system) in an "on-demand" manner—e.g., according to a user's "manual" request to perform such an assessment, according to a defined schedule, etc. Thus, security assessments performed by a security assessment service are different than anti-virus scans, which operate by looking for virus signatures in files—i.e., known patterns of malicious code/data in files, while security assessments seek to identify vulnerable (or potentially vulnerable) aspects of computing resources.

However, while a security assessment service can provide a benefit, it is possible that such manual or scheduled assessments, due to a window of time existing between assessment runs, might not be able to detect a problem for a substantial amount of time while the computing resource(s) remains vulnerable.

Accordingly, embodiments for configurable event-based compute instance security assessment are described that perform security assessments responsive to an event. By allowing a user to configure the event-based triggering of a security assessment, embodiments reduce the burden placed upon the user to vigilantly and closely monitor his or her computing resources and/or external systems for security-related issues. Moreover, some embodiments eliminate, or significantly reduce, the amount of time that exists where a user's computing resources remain vulnerable upon the detection of suspicious activity or of a new vulnerability.

One exemplary embodiment is illustrated in FIG. 1, which is a block diagram illustrating a service provider system 100 providing configurable event-based compute instance security assessments according to some embodiments. The service provider system 100 may implement a variety of computing resources 101 on behalf of many users within the service provider system 100 at one or multiple geographic locations. The computing resources 101 can include, for example, data/storage resources, networking resources, application resources, computing resources, etc. However, in some embodiments the service provider system 100 "manages" computing resources 101 that are deployed or implemented outside of the service provider system 100—e.g., on-premises of a user 102 (e.g., in a corporate data center, in a separate cloud environment, in an enterprise network).

The computing resources 101 are implemented on behalf of, or for the benefit of, a user 102. The user 102 may be a person operating for the benefit of (or otherwise associated with) an entity such as a business, organization, governmental body, or other collective, though the user 102 can also be an individual not operating for the benefit of any such affiliation. In some embodiments, the user utilizes a user account that is logically "under" a customer account, perhaps with other user accounts.

In FIG. 1, the user 102 configures the security assessment service 114 to perform security assessments of one or more computing resources 101 responsive to the occurrence of one or more events. A security assessment includes checking the computing resources 101 of the user 102 (e.g., one or multiple compute instances, application templates, applications, virtual network(s), data service instances, etc.) against a set of one or more rules 130 to determine whether any security conditions exist.

A security condition can be any of a variety of configurations or operating conditions that, when they exist, violate a security rule. For example, the security assessment service 114 may utilize rules 130 from rules packages: e.g., a set of rules that identify the existence of Common Vulnerabilities and Exposures (CVEs) published by the National Cybersecurity FFRDC ("NCF"), deviations from Center for Internet Security (CIS) Benchmarks, a set of rules that detect deviations from general best practices (e.g., disabling root login over remote connections such as Secure Shell (SSH), disabling support for SSH version 1, disabling password authentication over SSH, requiring passwords to be periodically changed or be of a minimum length/complexity, etc.), a set of rules that detect runtime performance issues (e.g., the use of insecure protocols to connect to a remote host, the use of insecure passwords, the use of insecure protocols or ports, etc.), etc.

At circle '1', an electronic device 104 transmits one or more configuration messages 150 to the service provider system 100. For example, a user 102 may use the electronic device 104 (e.g., a client end station, server end station) to transmit one or more configuration messages 150 to a provider frontend service 112 of the service provider system 100, though the electronic device 104 may transmit the one or more configuration messages 150 according to a program (or application) and may or may not be actively used by the user 102.

As one example, the user 102 may utilize the electronic device 104 to view a website or application providing a portal (or "management console") that allows the user 102 to manage or control one or more computing resources provided or managed by the service provider system 100 via one or more configuration messages 150. The user 102 may interact with the website or application (e.g., using some sort of user input/output component of the electronic device) to configure which computing resources are to be assessed (e.g., compute instances), which rules 130 are to be used in an assessment, which events will trigger an assessment, and/or how the assessment is to be performed (e.g., a number of times an assessment is to be run after an event, an amount of time that should elapse before an assessment is to be run upon the detection of an event, etc.). Example user interfaces that can be provided to the user 102 and used by the user 102 will be described in further detail with regard to FIG. 5 and FIG. 6 later herein.

The user 102 can "submit" the configuration (e.g., click a button to perform a HyperText Markup Language (HTML) form submission), causing the electronic device 104 to transmit the one more configuration messages 150. The one or more configuration messages 150 can be of a variety of formats and types based on the particular implementation of the service provider system 100. In some embodiments, the one or more configuration messages 150 are HyperText Transfer Protocol (HTTP) request messages (e.g., HTTP "GET" or "POST" messages) sent to an Application Programming Interface (API) endpoint of a service provider system 100, though many other types of commands can be utilized in other embodiments that are well-known to those of skill in the art. In some embodiments using an API, the API is a REpresentational State Transfer (REST) (or "RESTful") web service and thus the one or more configuration messages 150 may adhere to a set of uniform, predefined stateless operations.

The one or more configuration messages 150 carry data that identifies or indicates data values, conditions, and/or settings used to configure the security assessment service 114 to perform security assessments for the computing resources 101. For example, in an embodiment the one or more configuration messages 150 identify a "target" system (e.g., a collection of one or more computing resources) that is to be assessed, identify security tests that are to be performed/checked during the assessment, a duration of an assessment run, etc.

Upon receipt of the one or more configuration messages 150, the provider frontend service 112 at circle '2' sends an configuration data 152 to the security assessment service 114. In some embodiments, the configuration data 152 is sent via an HTTP request message sent to the security assessment service 114, and in other embodiments the configuration data 152 is sent via another type of message. For example, in some embodiments the configuration data 152 is sent via the provider frontend service 112 placing the configuration data 152 in a job queue, and then the security assessment service 114 (or another entity operating for its benefit) retrieves the configuration data 152 from the job queue.

The configuration data 152 in some embodiments includes an identifier of the one or more computing resources 101 (or a target identifier that can be used to identify the one or more computing resources 101) and an identifier of one or more of the rules 130 (or sets of rules, referred to as "rules packages") selected to be used when performing an assessment of the computing resources 101. In some embodiments, the configuration data 152 also includes data indicating assessment scheduling, such as an amount of delay that is to occur before performing a security assessment upon the detection of an event, a number of times that the security assessment is to be run upon the detection of an event (and optionally one or more delays between such assessment runs), etc.

Upon obtaining (e.g., receiving, reading from a queue) the configuration data 152, the security assessment service 114 may cause the service provider system 100 to be configured to detect the necessary one or more events, examples of which will be provided later herein with regard to FIG. 2, etc. As a result, in some embodiments an internal service 106A and/or external service 106B may be configured to detect particular events.

As one example, an internal service 106A at circle '3' may interact with computing resources 101 (shown by line 154) to detect an event occurring at/within the computing resources 101, and at circle '4A' directly or indirectly provide an event notification 162 to the security assessment service 114. The event notification 162 indicates what type of event was observed, and in some embodiments, indicates which computing resource 101 the event involved or was observed at.

As another example, an external service 106B may detect an event and directly or indirectly provide, at circle '4B', an event notification 162 to the security assessment service 114. The event notification 162 indicates what type of event was observed.

After obtaining (e.g., receiving) the event notification 162, the security assessment service 114 launches one or more security assessments according to the user-specified scheduling for the security assessment(s) at circle '5', which can involve sending and/or receiving security assessment data 166. For example, the security assessment service 114 may immediately launch a security assessment. However, the user 102 may instead configure the security assessment service 114 to wait an amount of time before launching a security assessment. Such a delay period may be helpful to allow a potentially malicious scenario to conclude—e.g., launching a security assessment too quickly upon the detection of the event may not find any issues, perhaps because an attacker (or malware) causing the initial event may have not had enough time to actually cause harm or because the attacker/malware may detect the occurrence of the security assessment (e.g., by seeing system activity change such as a process being executed, seeing certain security assessment data 166 being sent or received, etc.) and either pause or halt the malicious activity to attempt to avoid detection. Additionally, or alternatively, the security assessment service 114 may be configured to perform multiple security assessments of different types and/or at different times—e.g., a first security assessment 10 minutes after the event was detected, a second security assessment 2 hours after the event was detected, and a third security assessment 1 day after the event was detected. Such a schedule can help catch any "new" vulnerabilities due to fast-occurring malicious actions while also catching vulnerabilities resulting from more slow-moving malicious actions that may not occur (or be evident) for a period of time. Additional detail regarding how security assessments may be performed in certain embodiments is described further with regard to later figures.

At the conclusion of one or more of the security assessments, the security assessment service 114 generates a set of results 164 describing its "findings" indicating what vulnerabilities, if any, were found during the security assessement(s). For example, in various embodiments the results 164 can include identifiers of which security deficiencies were found to exist (with descriptions of the deficiencies), identifiers of the one or more affected computing resources (having the vulnerabilities), instructions for how to remedy the security deficiencies, etc. The results 164 are provided at circle '6A', via the provider frontend service 112, to an electronic device 104 at circle '6B', where the results 164 can be presented to the user 102 or used by an application executing at the electronic device 104. In some embodiments, the results 164 are provided as HTML data sent using HTTP messages, though in other embodiments the results 164 may be provided via email messages, Short Message Service (SMS) messages, push notifications, a web portal, phone calls, etc.

In some embodiments, the user 102 may configure the security assessment service 114 to attempt to address (or remedy) certain security vulnerabilities that may be found. For example, in some systems it may be useful for a vulnerability to be "fixed" as soon as possible, such as when the computing resources involve sensitive data or can access sensitive data. This configuration may occur prior to a security assessment (e.g., along with or part of configuration messages 150), and indicate that the security assessment service 114 is allowed to automatically (e.g., without specific later approval from the user 102) address a vulnerability. The configuration may also cause the security assessment service 114 to, upon identifying a vulnerability that can be addressed by the service provider system 100, seek confirmation from the user 102 that the vulnerability is to be addressed. To address a vulnerability, the security assessment service 114 can interact with other components of the service provider system 100 to address each detected vulnerability—e.g., to apply a software patch, to shut down an affected compute instance, to close a port or terminate a connection, etc. As one example, in some embodiments the security assessment service 114 can instruct a patch manager (e.g., of an affected compute instance) to do a forced check to see if a patch is available. As another example, a user 102 could configure the service provider system 100 (e.g., a patch management service) to patch all of multiple compute instances in a fleet executing for the user, or could configure the service provider system 100 to perform a staggered patching, whereby certain amounts of computing instances in a user's fleet are slowly patched over time (e.g., 25% of fleet immediately and some or all of the remaining fleet instances after a number of hours with no alarms being generated indicative of performance failures, etc.). In some embodiments when the security assessment service 114 causes a vulnerability to be addressed, the results 164 provided to the user 102 may include which, if any, actions were performed.

As described, a user 102 may configure the service provider system 100 to detect events that occur at computing resources 101. However, in some embodiments the user 102 (additionally or alternatively) configures the service provider system 100 to detect events that occur outside of the computing resources 101 of a user but still within the service provider system 100, or even outside of the service provider system 100 altogether.

For example, upon receipt of a configuration data 152 at circle '2', the security assessment service 114 may configure a service 106A or service 106B to send event notifications 162 for particular events, or may poll the service 106A and/or service 106B to receive event notifications 1662 that may indicate particular events. Additionally or alternatively, service 106A and/or service 106B may directly or indirectly provide event notification 162 information the security assessment service 114 by, for example, sending data to a monitoring service that will be described in additional detail below.

This configuration can be useful for a variety of reasons, such as gaining insight into more advanced types of events being determined outside of a particular computing resource 101, quickly identifying at-risk computing resource 101 upon an external service 106B publishing a new security vulnerability, etc. For example, a user 102 may configure the service provider system 100 to launch a security assessment for one, multiple, or all of the user's computing resources 101 when a new type of security vulnerability is published by an external service 106B. As another example, a user 102 can configure the service provider system 100 to launch a security assessment for one, multiple, or all of the user's compute instances 106A-106N if a security breach or system malfunction is detected within the service provider system 100 that involves computing resources of other users. As yet another example, a user 102 can configure the service provider system 100 to launch a security assessment responsive to a physical sensor device detecting an event—e.g., a physical sensor detecting a physical computing rack being opened or movement near a rack (perhaps the same rack where some portion of the user's computing resources 101 are located or executing), etc.

As another example, in some embodiments, an internal service 106A (e.g., a "shadow service") tracks a configuration or state of user computing resources 101 (e.g., compute instances, data service instances, virtual networks, etc.) in one or more "shadow documents." In some embodiments, a shadow document is a JavaScript Object Notation (JSON) document that is used to store and retrieve current state information for a computing resource 101. Thus, the service 106A in some embodiments is configured to track changes to a state or configuration of computing resources 101 and, at circle '4A', reports back changes indicative of events.

In some embodiments, the service 106A is an automatic scaling service of the service provider system 100 that monitors one or more computing resource 101 (e.g., a fleet of compute instances of a user that collectively implement an application or portion thereof) and can automatically launch additional compute instances (e.g., during demand spikes), eliminate compute instances (e.g., during relatively "quiet" periods where compute instances have excess capacity, when an impaired compute instance is detected), etc., in order to automatically "scale" the user's application. The security assessment service 114 can obtain an event notification 162 upon an action of the automatic scaling service, e.g., upon the launch of an additional compute instance for a user.

In some embodiments, the service 106A is a code deployment service that automates code deployments to compute instances (e.g., development instances, test instances, production instances). The security assessment service 114 can thus obtain event notifications 162 upon an "event" that is an action of the code deployment service, e.g., upon the code being successfully (or unsuccessfully) deployed to one or more compute instances.

In some embodiments, the service 106A may monitor 154 other types of computing resources 101 within the service provider system 100 to detect an event. For example, the service 106A may monitor a data service (e.g., a file server, database) that provides access to data to clients to detect atypical activity involving certain data. The service 106A, in some embodiments, determines a "regular" data access pattern associated with data, and upon detecting a deviation from the regular data access pattern (e.g., a user suddenly accessing significantly more data than is typical of the user), the service 106A can provide the security assessment service 114 an event notification 162 upon this deviation being detected by the service 106A.

Figure 2:
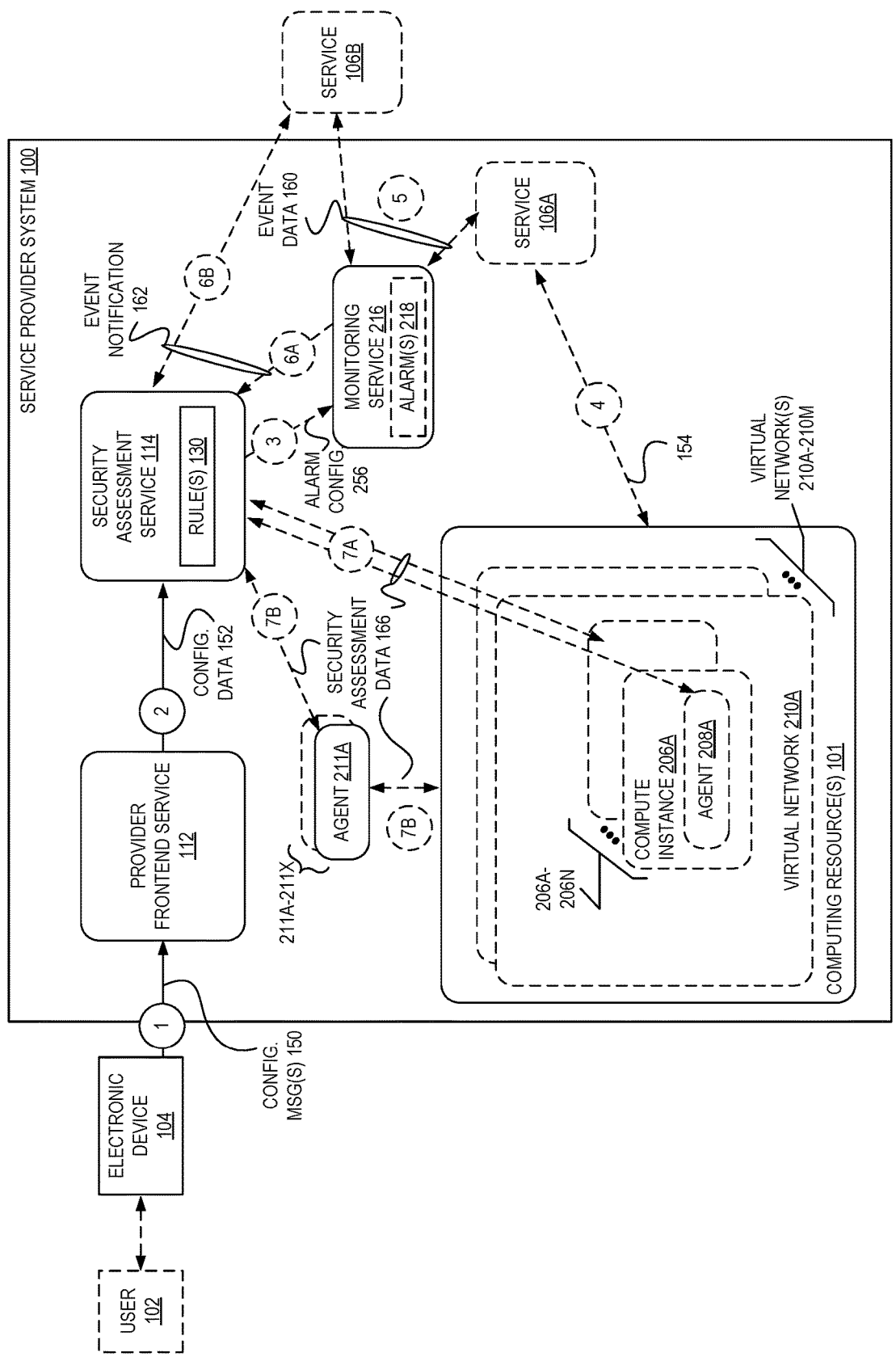
FIG. 2 is a block diagram illustrating a service provider system utilizing agents and a monitoring service for configurable event-based compute instance security assessments according to some embodiments.

For further detail of some embodiments, FIG. 2 is a block diagram illustrating a service provider system utilizing agents 211A-211X, 208A-208N and a monitoring service 216 for configurable event-based compute instance security assessments according to some embodiments. The operations shown with regard to circle '1' and circle '2' are the same as described above with regard to FIG. 1; however, the other operations may be different or numbered differently.

As indicated with regard to FIG. 1, the security assessment service 114 can obtain event notifications 162 in a variety of ways. As one example, upon receipt of configuration data 152 at circle '2', the security assessment service 114 can send an alarm configuration 256 message to a monitoring service 216 at circle '3' to cause the monitoring service 216 to implement one or more alarms 218 that indicate, to the monitoring service 216, when to provide an event notification 162 to the security assessment service 114. Alternatively, the provider frontend service 112 may instead send alarm configuration message 256.

The monitoring service 216 is a logically-centralized system that can allow for the monitoring of computing resources (e.g., compute instances, database tables, user-deployed applications, etc.) of the service provider system 100—e.g., by collecting and tracking metrics or event data, collecting and monitoring log files, etc. The monitoring service 216, in some embodiments, can configure alarms 218 that can be "triggered" upon some occurrence being observed (or determined) by the monitoring service 216. For example, in some embodiments various entities of the service provider system 100 will send event data 160 to the monitoring service 216 that may be stored by the monitoring service 216, and an alarm 218 may be set to be triggered upon one or more particular events being identified by the monitoring service 216 based on the event data 160. The event data 160 may also include information that may be helpful for monitoring purposes, which can be different based on the particular type of event that occurred, including but not limited to a timestamp from when the event was detected, an identity of an involved account, an identifier of an involved software program or version, etc.

For example, the security assessment service 114 may send, as part of the alarm configuration 256 message, an indication that the security assessment service 114 wishes to receive an event notification 162 upon an external service 106B providing event data 160 that is indicative of a type of event (e.g., a 0-day vulnerability being published), or when an internal service 106A (as a result of monitoring 154 a computing resource 101 at circle '4') detects a particular event within a compute instance 206A and thus provides event data 160 at circle '5' to the monitoring service 216, etc. In this way, the security assessment service 114 can effectively "register" its interest in particular types of event data 160 being provided to the monitoring service 216, leading to the monitoring service 216 sending event notifications 162 to notify the security assessment service 114 upon its detection of event data 160 satisfying a condition of the alarm(s) 218. In some embodiments, an alarm 218 includes a condition that can be evaluated using event data 160, which can test for particular identifiers (e.g., of computing resources 101 or services 106A-106B) within event data 160, types of event data 160, etc.

Additionally, as indicated with regard to FIG. 1, the security assessment service 114 can cause security assessments to be performed in a variety of ways, such as those shown with regard to circle '7A' and circle '7B'.

In some embodiments, assessment data 166 one or more agents 208A-208N (or agents 211A-211X) are configured to periodically call back to the security assessment service 114 to determine whether there is assessment-related work to be done (e.g., whether the agents 208A-208N and/or agents 211A-211X are to perform security assessment related tasks, etc.). In some embodiments, the security assessment service 114 sends back, in response, data indicating that the agents 208A-208N, 211A-211X are to perform one or more assessment tasks. Upon the completion of some or all of the tasks making up a security assessment, the agents 208A-208N, 211A-211X send back to the security assessment service 114 (as part of security assessment data 166) the result(s) of the assigned security assessment tasks.

In some embodiments where the computing resources 101 includes one or more compute instances 206A-206N (that may or may not be within one or more virtual networks 210A-210M), agents 208A-208N execute in (or with) the one or more compute instances 206A. In this case, the agents 208A-208N have visibility into activity occurring within the compute instance(s) 206A-206N, and thus can detect intra-compute instance events. Some embodiments additionally or alternatively utilize agents 211A-211X that are not "within" or a part of computing resources 101, but may monitor the computing resources 101 from a "remote" perspective and/or communicate with other systems/services within the service provider system 100 to gather security assessment data—e.g., identify/analyze account information associated with the user 102, identify/analyze security configuration data for the user 102 that is provided/stored in another system (e.g., authentication and/or authorization policy information associated with the user 102, account, and/or computing resources 101).

For example, to perform a security assessment, each of the one or more agents 208A-208N may monitor, collect, and/or analyze behavioral data (or "telemetry"), such as the use of secure channels, network traffic among running processes, and/or details of communications with other services of the service provider system 100. The reported back findings can be analyzed by the security assessment service 114 with regard to a set of security rule packages specified by an assessment template defined for the assessment run, to produce one or more "findings," which are identifications of potential security issues of various severities.

Figure 3:
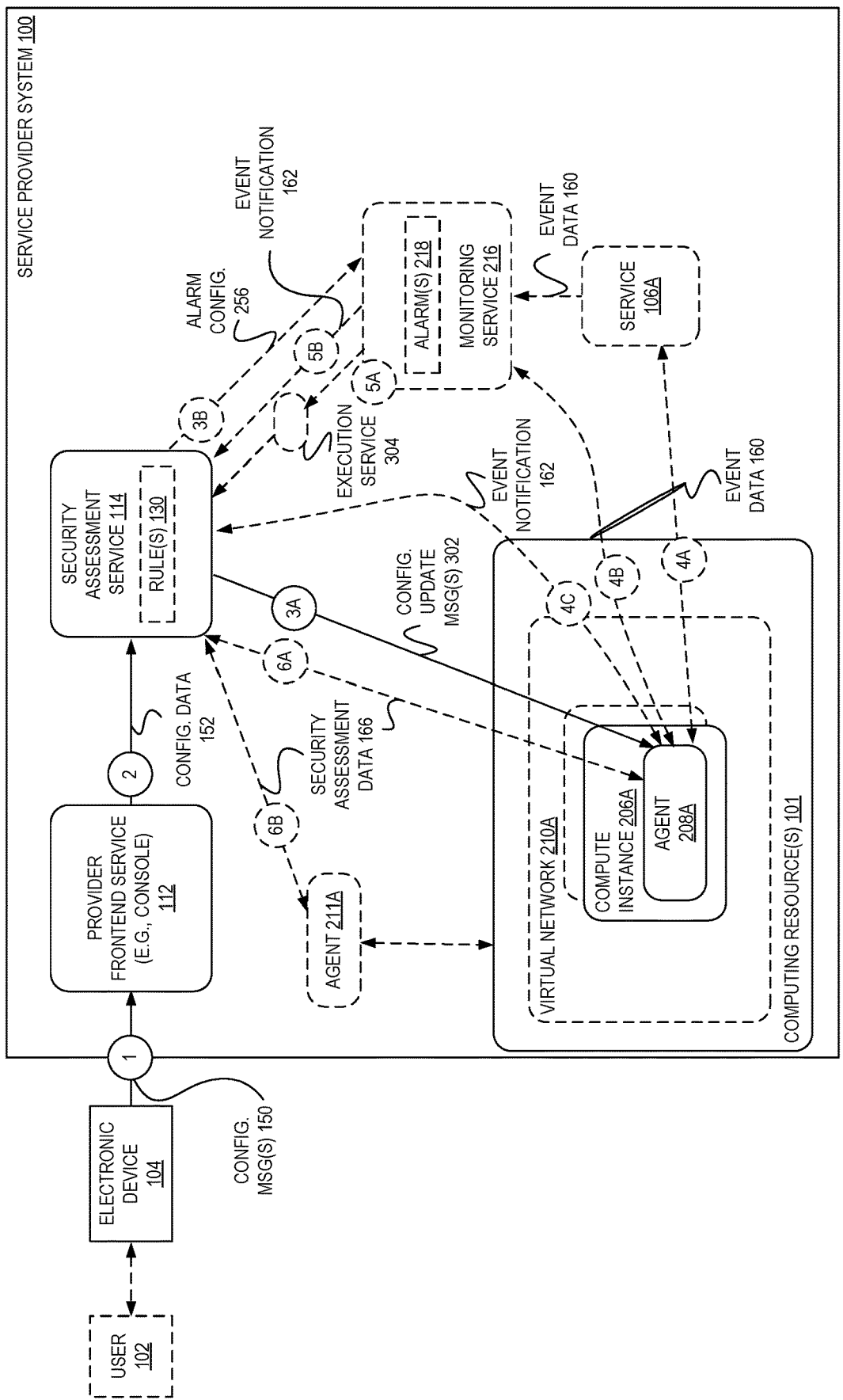
FIG. 3 is a block diagram illustrating event data reporting techniques of a service provider system for configurable event-based compute instance security assessments according to some embodiments.

Agents can additionally or alternatively be used as part of the event detection operations. For example, FIG. 3 is a block diagram illustrating event data reporting techniques of a service provider system for configurable event-based compute instance security assessments according to some embodiments. The operations shown with regard to circle '1' and circle '2' are the same as described above with regard to FIG. 1; however, the other operations may be different or numbered differently.

In some embodiments, after receipt of the configuration data 152 at circle '2', the security assessment service 114 sends one or more configuration update messages 302 to one or more agents 208A-208N executed by/with one or more compute instances 206A-206N (e.g., of the computing resources 101), which may be identified by (or using) the configuration data 152. The one or more configuration update messages 302, in some embodiments, are HTTP request messages, though other types of messages and message-sending protocols can be used (e.g., job queues).

The one or more configuration update messages 302 cause a corresponding one or more agents 208A-208N to be configured to watch for certain events. The agents 208A-208N, in some embodiments, are configured to watch for those of the events indicated by the configuration data that occur (or can be detected) at compute instances (e.g., as opposed to events that may be outside of the compute instance 206A-206N, computing resources 101, and/or service provider system 100). In one example scenario, a user 102 may want a security assessment to be triggered upon any of five events occurring: (1) a remote login of the "root" account (e.g., via SSH) occurring into any compute instance of the user, (2) the "sudo" command being executed at any compute instance of the user, (3) a configuration file at any compute instance of the user changing, (4) a new software package being installed or updated at any compute instance of the user, or (5) the operating system of any compute instance of the user being updated Thus, the agent(s) 208A-208N watch for any of these five events. The agent(s) 208A-208N monitor the compute instances 206A-206N for these events in a variety of ways depending upon the particular operating system of the compute instance, for example, by launching a thread that monitors the system configuration, by monitoring one or more log files, by use of a kernel module, etc.

Thereafter, some or all of the one or more agents 208A-208N can provide event data 160 at circle '4A' to a service 106A, which in turn provides the event data 160 to a monitoring service 216, which at some point is provided to the security assessment service 114 as event notification 162 at circle '5B'. Additionally or alternatively, some or all of the one or more agents 208A-208N can provide event data 160 at circle '4B' directly to the monitoring service 216, which at some point is provided to the security assessment service 114 as event notification 162 at circle '5B'. Moreover, additionally or alternatively, some or all of the one or more agents 208A-208N can directly provide event notifications 162 at circle '4C' directly to the security assessment service 114. Thus, the particular communication paths can be flexibly selected in different embodiments based on the particular needs of the particular service provider system 100 that is implemented.

In some embodiments, the triggering of a security assessment (by the security assessment service 114) can occur according to a different configuration. For example, the monitoring service 216 can be configured with one or more alarms 218 (as described above); however, an alarm being satisfied may lead to the monitoring service 216 sending a command to assessment data 166 assessment data 166 an execution service 304, which causes the security assessment service 114 to launch a security assessment. An execution service 304, in some embodiments, provides a ("serverless") code execution engine that executes a block of code (e.g., a function). One such block of code that could be executed may trigger the security assessment service 114. Thus, the monitoring service 216 in some embodiments indirectly (e.g., via the execution service 304) causes the security assessment service 114 to launch a security assessment.

Figure 4:
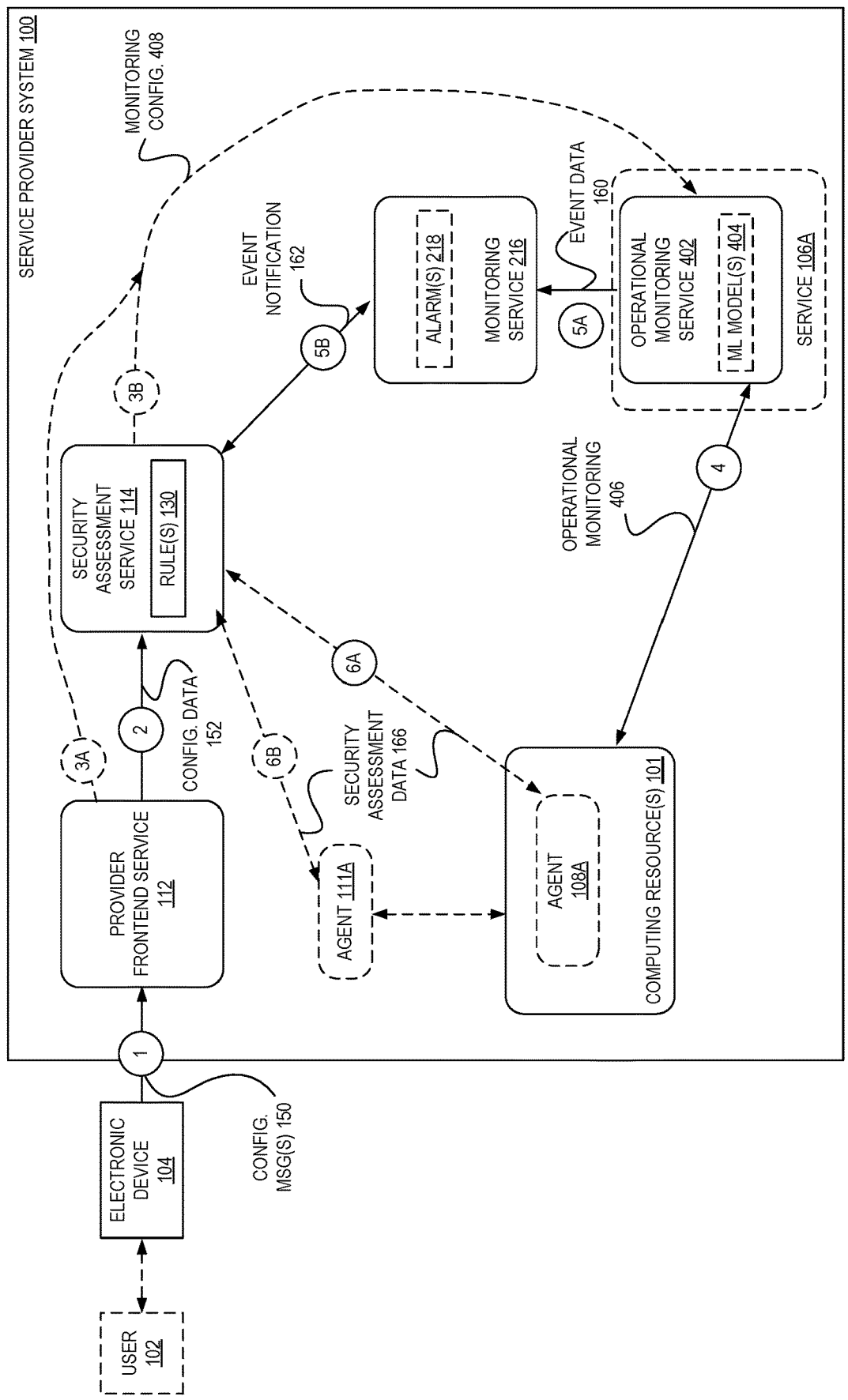
FIG. 4 is a block diagram illustrating a service provider system utilizing an operational monitoring service for configurable event-based compute instance security assessments according to some embodiments.

An additional example of an internal service 106A based event data reporting is now presented with regard to FIG. 4, which is a block diagram illustrating a service provider system utilizing an operational monitoring service for configurable event-based compute instance security assessments according to some embodiments. The operations shown with regard to circle '1' and circle '2' are the same as described above with regard to FIG. 1; however, the other operations may be different or numbered differently.

Events from within (or directly involving) a computing resource 101, in some embodiments, can be detected without needing to specifically configure any agent within the computing resources 101 (e.g., a compute instance or virtual network). In the embodiment illustrated in FIG. 4, the provider frontend service 112 and/or security assessment service 114 (at circle '3A' and/or circle '3B') send a monitoring configuration message 408 to an operational monitoring service 402 to configure the operational monitoring service 402 to perform operational monitoring 406 of computing resources 101 and report event data 160 to a monitoring service 216.

The operational monitoring service 402 is a service that monitors the activity of the computing resources 101 to detect deviations from previous behavior of these computing resources 101. For example, in some embodiments the operational monitoring service 402 constructs one or more machine learning (ML) models 404 based on training data reflecting the operational activity of computing resources 101 over a period of time (e.g., a training period)—e.g., the types of requests that arrive, the amount of requests that arrive, how long it typically takes for certain requests to be processed by the computing resources 101, what sources of traffic exist that send requests to the computing resources 101, etc. The various types of ML models 404 and techniques for generating the ML models 404 may be specific to the particular environment and can be derived by those of skill in the art, and thus are not presented in additional detail to avoid obscuring aspects of the embodiments.

Using one or more ML models 404, at circle '4' the operational monitoring service 402 "monitors" the operation of computing resources 101 to detect anomalous behavior—i.e., operational activity that deviates from the "normal" behavior reflected by the ML models 404. When such anomalous behavior is detected by the operational monitoring service 402, at circle '5' the operational monitoring service 402 sends event data 160 to the monitoring service 216 (e.g., to be registered/stored there as an event). Accordingly, an alarm 218 may be triggered by the monitoring service 216 (or a "pull" of event data initiated by the security assessment service 114, such as via long polling, HTTP server push techniques, etc.) resulting in the transmission of an event notification 162. Thereafter, the security assessment service 114 launches a security assessment at circle '6A' and/or circle '6B' as described above.

Figure 5:
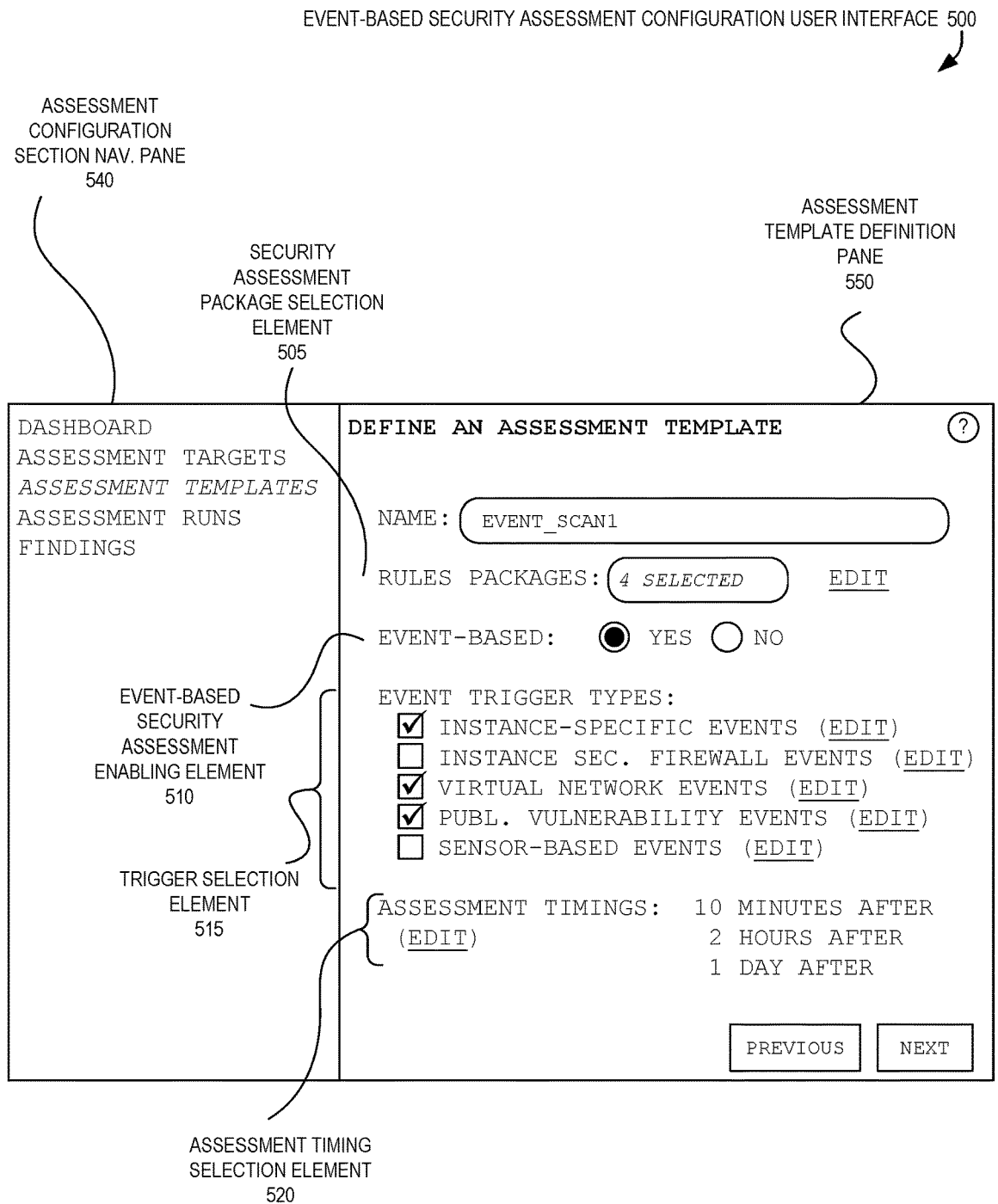
FIG. 5 is a diagram illustrating an exemplary event-based security assessment configuration user interface according to some embodiments.

As described throughout this description, in some embodiments users configure the event-based security assessments themselves, which allows the users to fine-tune the amount and/or type of security assessments that may be launched on their behalf. For example, some users may not want security assessments to be performed regardless the circumstance, while other users may want to configure security assessments for a wide array of different events. To perform this configuration, a user may utilize a user interface (UI) of a web application or other application. For example, FIG. 5 is a diagram illustrating an exemplary event-based security assessment configuration UI 500 according to some embodiments.

The illustrated event-based security assessment configuration UI 500 includes an assessment configuration section navigation pane 540 that includes UI elements allow the user to configure different factors related to security assessments. As shown, the "ASSESSMENT TEMPLATES" configuration section is selected, meaning that assessment templates may be configured in the other pane—the assessment template definition pane 550.

The assessment template definition pane 550 allows a user to define a "template" for a security assessment to be applied to various resources. As illustrated, the user 102 is configuring a template by the name of "EVENT_SCAN1" and has indicated that the template is event-based (e.g., per event-based security assessment enabling element 510—here, a HTML radio button). The template is configured to cause assessment scans for four different "packages" of rules, per security assessment package selection element 505. In some embodiments, the security assessment service offers multiple different rules packages that can be used to perform different types of analysis on a target system. Rules can be grouped together into distinct rules packages by category, severity, etc., which gives users the choice to determine what kinds of analysis are to be performed. For example, a first rule package may include a number of rules that can be used to assess a variety of aspects of applications, while another rule package might include rules for assessing a specific area of concern or to uncover specific security problems. As another example, a rules package may include rules that seek to detect high-severity security issues, while another rules package may include rules that detect lower-severity issues. However, exemplary selected rules packages are not shown here in detail to avoid obscuring aspects, though high-level examples of rules packages are described earlier herein.

As illustrated, this template indicates that three different types of event trigger types will be "watched" for (e.g., via trigger selection element 515—here, HTML checkboxes). In this case, the user 102 has selected that instance-specific events, virtual network events, and published vulnerability events are to cause the triggering of a security assessment, while instance security firewall events and sensor-based events are not selected. In some embodiments, the user uses the "edit" text next to each trigger selection element 515 to further define which events from within these "event types" are to be watched for.

Figure 6:
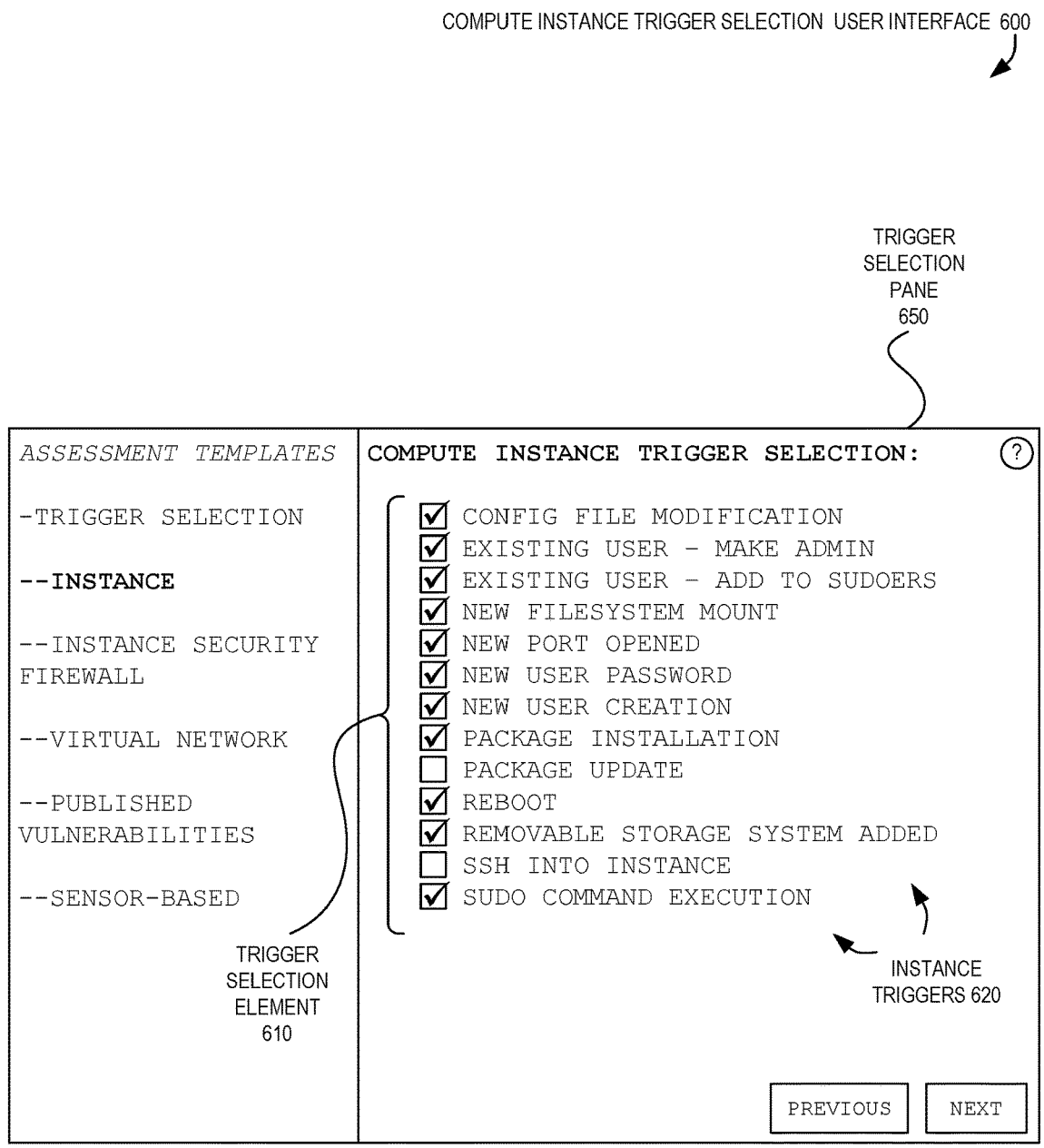
FIG. 6 is a diagram illustrating an exemplary compute instance trigger selection user interface according to some embodiments.

For example, an example compute instance trigger selection UI 600 according to some embodiments is shown in FIG. 6. The compute instance trigger selection UI 600 includes a trigger selection pane 650 allowing the user to customize which "instance" specific triggers 620 are an event that should cause the launching of a security assessment.

In this example, via a trigger selection element 610, the user has indicated that a security assessment is to be launched when any of the following events are detected at a compute instance: a configuration file is modified, an existing user has been granted administrative privileges, an existing user has been added to a list of "sudo"ers (those users having permission to execute the "sudo" command to run another program with administrative privileges), a new filesystem has been mounted, a new network port has been opened, a new user has set a password, a new user has been created, a software package has been installed, the compute instance has been rebooted, a removeable storage system has been added, or a user has executed a command using the "sudo" command. In this example, the user has chosen not to trigger a security assessment due to a software package being updated or a remote (SSH) connection into the instance occurring.

Turning back to FIG. 5, the assessment template definition pane 550 also includes an assessment timing selection element 520 that allows the user to define how many security assessments are to be performed responsive to a detected event, and when these security assessments are to be performed. As shown, the user has configured the template to cause a first security assessment to be launched ten minutes after the event is first detected, a second security assessment to be launched two hours after the event is detected, and a third security assessment to be launched one day after the event is detected. In different examples, the user could configure more security assessments to be launched for an event, fewer security assessments to be launched for an event (e.g., just one, two), and/or with different timing delay requirements.

Figure 7:
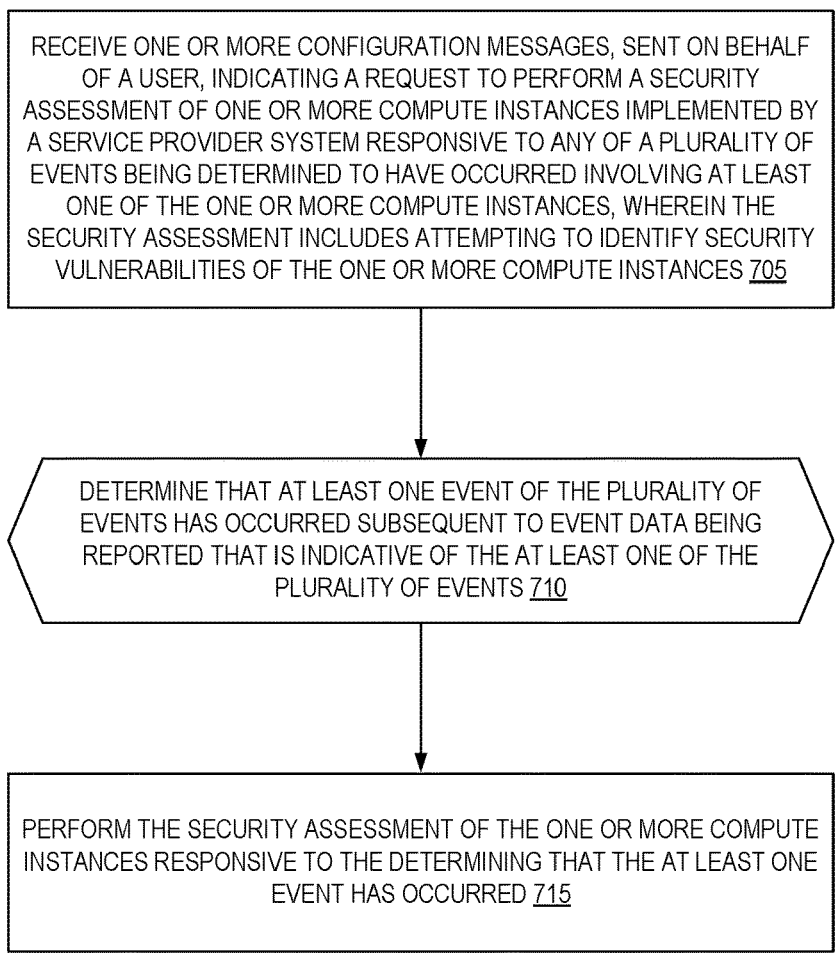
FIG. 7 is a flow diagram illustrating operations for configurable event-based compute instance security assessments according to some embodiments.

Example operations for implementing various techniques disclosed herein will now be described. FIG. 7 is a flow diagram illustrating operations 700 for configurable event-based compute instance security assessments according to some embodiments. Some or all of the operations 700 (or any other processes described herein, or variations, and/or combinations thereof—such as operations 800, etc.) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the security assessment service 114 of the other figures.

The operations 700 include, at block 705, receiving one or more configuration messages, sent on behalf of a user, indicating a request to perform a security assessment of one or more compute instances implemented by a service provider system responsive to any of a plurality of events being determined to have occurred involving at least one of the one or more compute instances. The security assessment includes attempting to identify security vulnerabilities of the one or more compute instances. Exemplary events have been detailed herein.

In some embodiments, the plurality of events includes one or more of: a privilege of an existing user account of the compute instance being modified; a new user account for the compute instance being added; a new port being opened at the compute instance; an application package being installed or updated at the compute instance; a configuration file associated with the compute instance being modified; a remote login into the compute instance occurs; a command being executed by the compute instance using security privileges of another user; or a removable storage system being mounted by the compute instance.

In some embodiments, the one or more configuration messages further indicate a request to perform the security assessment of the one or more compute instances responsive to a second event. The second event is to be generated by an operational monitoring service of the service provider system responsive to the operational monitoring service detecting operational activity of the target system that differs at least a threshold amount from previously observed activity of the target system.

In some embodiments, the one or more configuration messages further indicate a request to perform the security assessment of the one or more compute instances responsive to a third event. The third event comprises an identification of a security vulnerability being published by a service that is external to the service provider system.

At block 710, the operations 700 include determining that at least one event of the plurality of events has occurred subsequent to event data being reported that is indicative of the at least one of the plurality of events. In some embodiments, block 710 includes receiving an event notification from a monitoring service. The monitoring service sent the event notification after it received an event data from a service or an agent. In some embodiments, the monitoring service sent the event notification responsive to an alarm being triggered, and in some embodiments the monitoring service sent the event notification responsive to a request sent (e.g., by security assessment service) seeking event notification data.

At block 715, the operations 700 include, performing the security assessment of the one or more compute instances responsive to the determining that the at least one event has occurred. In some embodiments, security assessment is performed after an amount of time, which in some embodiments is configured by a user. In some embodiments, the amount of time is indicated in the one or more configuration messages.

In some embodiments, block 715 includes sending one or more commands to one or more agents to cause the one or more agents to acquire security assessment data regarding a configuration characteristic or an operational characteristic of the one or more compute instances. The one or more agents operate within the one or more compute instances or operate external to the one or more compute instances but within the service provider system.

In some embodiments, the alarm was triggered responsive to an agent executed by (or with, such as at a same end station) the compute instance detecting an event and transmitting an event data to a monitoring service in response. In some embodiments, the monitoring service sends an event notification to the security assessment service to cause the security assessment service to perform the security assessment, but in some embodiments the monitoring service sends a command to another service (e.g., an execution service), which then causes the security assessment service to perform the security assessment.

Figure 8:
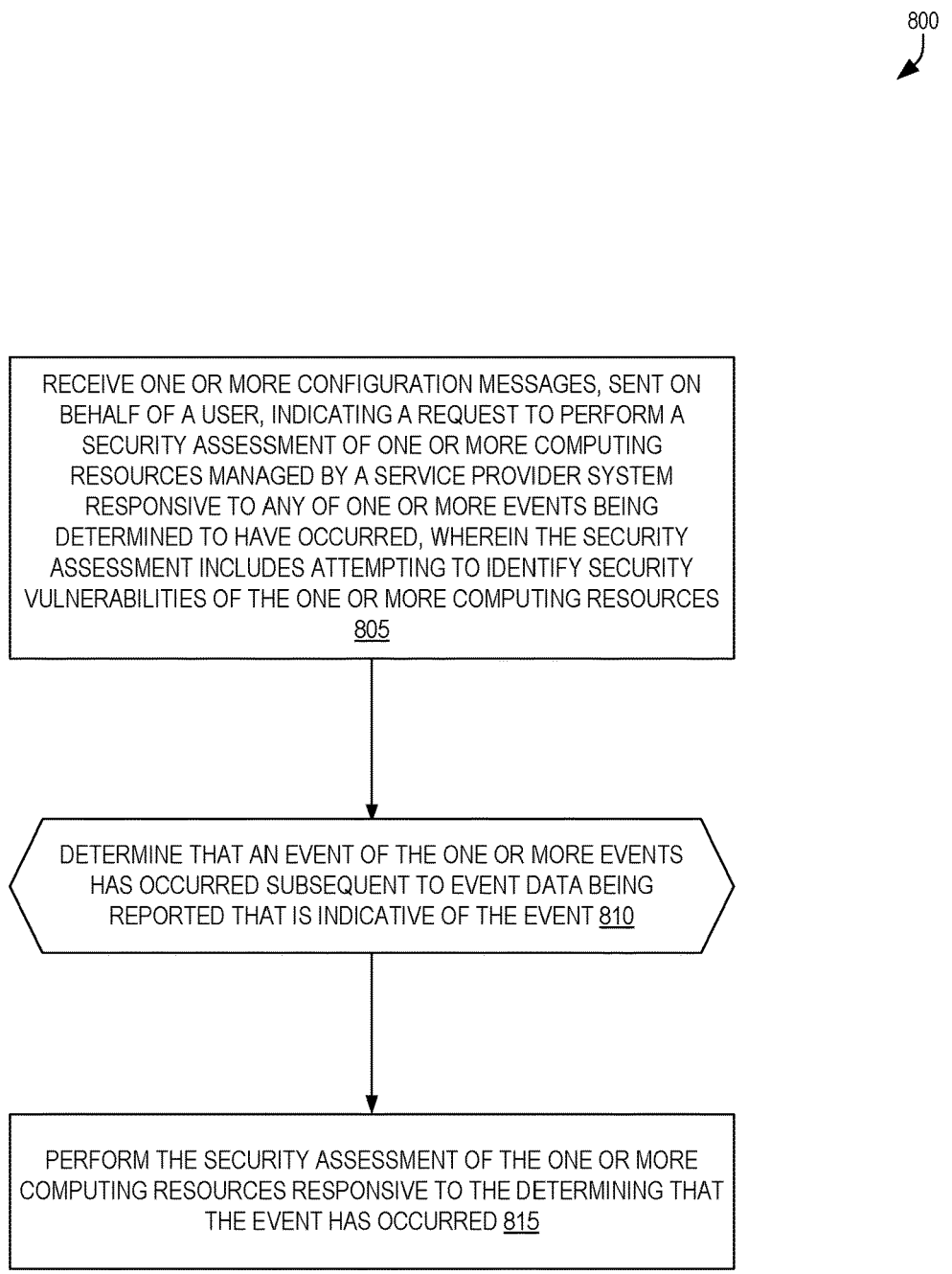
FIG. 8 is a flow diagram illustrating operations for configurable event-based compute instance security assessments according to some embodiments.

Another set of operations 800 is illustrated in FIG. 8, which is a flow diagram illustrating operations 800 for configurable event-based compute instance security assessments according to some embodiments. In some embodiments, operations 800 are performed by the security assessment service 114 of the other figures.

At block 805, the operations 800 include receiving one or more configuration messages, sent on behalf of a user, indicating a request to perform a security assessment of one or more computing resources managed by a service provider system responsive to any of one or more events being determined to have occurred. The security assessment is to include attempting to identify security vulnerabilities of the one or more computing resources. In some embodiments, the one or more configuration messages are HTTP request messages that are received at an API endpoint of a service provider system.

In some embodiments, the one or more computing resources are implemented within the service provider system, but in some embodiments the one or more computing resources are located at premises associated with the user that is outside of the service provider system. In some embodiments, the one or more computing resources include at least one computing resource that is within the service provider system and at least one computing resource that is outside the service provider system.

In some embodiments, the one or more computing resources include at least one of one or more compute instances; one or more data repositories; one or more database instances; or an application template configured by the user to define an application that can be provisioned in the service provider system for the user, the application template identifying one or more other computing resources and configurations of the one or more other computing resources.

In some embodiments, the one or more computing resources include one or more compute instances, and the one or more events include at least one event that occurs within the one or more compute instances or otherwise involved a change involving the one or more compute instances. In some embodiments, the event is one of: a process is created or terminated at the one or more compute instances; a network connection is established to or from the one or more compute instances; or a security configuration of the one or more compute instances is changed.

The operations 800 also include, at block 810, determining that an event of the one or more events has occurred subsequent to event data being reported that is indicative of the event. In some embodiments, the determining that the event has occurred comprises receiving, from a monitoring service of the service provider system, an event notification that identifies the event. A service within the service provider system provided the event data for the event to the monitoring service responsive to the service interacting with at least one of the one or more computing resources.

In some embodiments, the event comprises a new security vulnerability being published outside of the service provider system. In some embodiments, the event is either a new compute instance is launched or terminated for the user by a service of the service provider system responsive to a condition being met; or an automated code deployment occurs to one or more compute instances of the user.

At block 815, the operations 800 include performing the security assessment of the one or more computing resources responsive to the determining that the first event has occurred.

In some embodiments, performing the security assessment includes sending one or more commands to one or more agents to cause the one or more agents to acquire security assessment data regarding a configuration characteristic or an operational characteristic of the one or more compute instances. The one or more agents operate within the one or more compute instances or operate external to the one or more compute instances but within the service provider system.

In some embodiments, the one or more computing resources comprise an application template configured by the user to define an application that can be provisioned in the service provider system for the user. The application template identifies one or more other computing resources and configurations of the one or more other computing resources. The security assessment includes attempting to identify any versions of computing resources identified within the application template that are known to have a security vulnerability.

In some embodiments, the operations 800 further include sending an alarm configuration message to a monitoring service to request that the monitoring service send the event notification upon a condition being satisfied, where the condition is satisfied upon the monitoring service receiving the event data.

Figure 9:
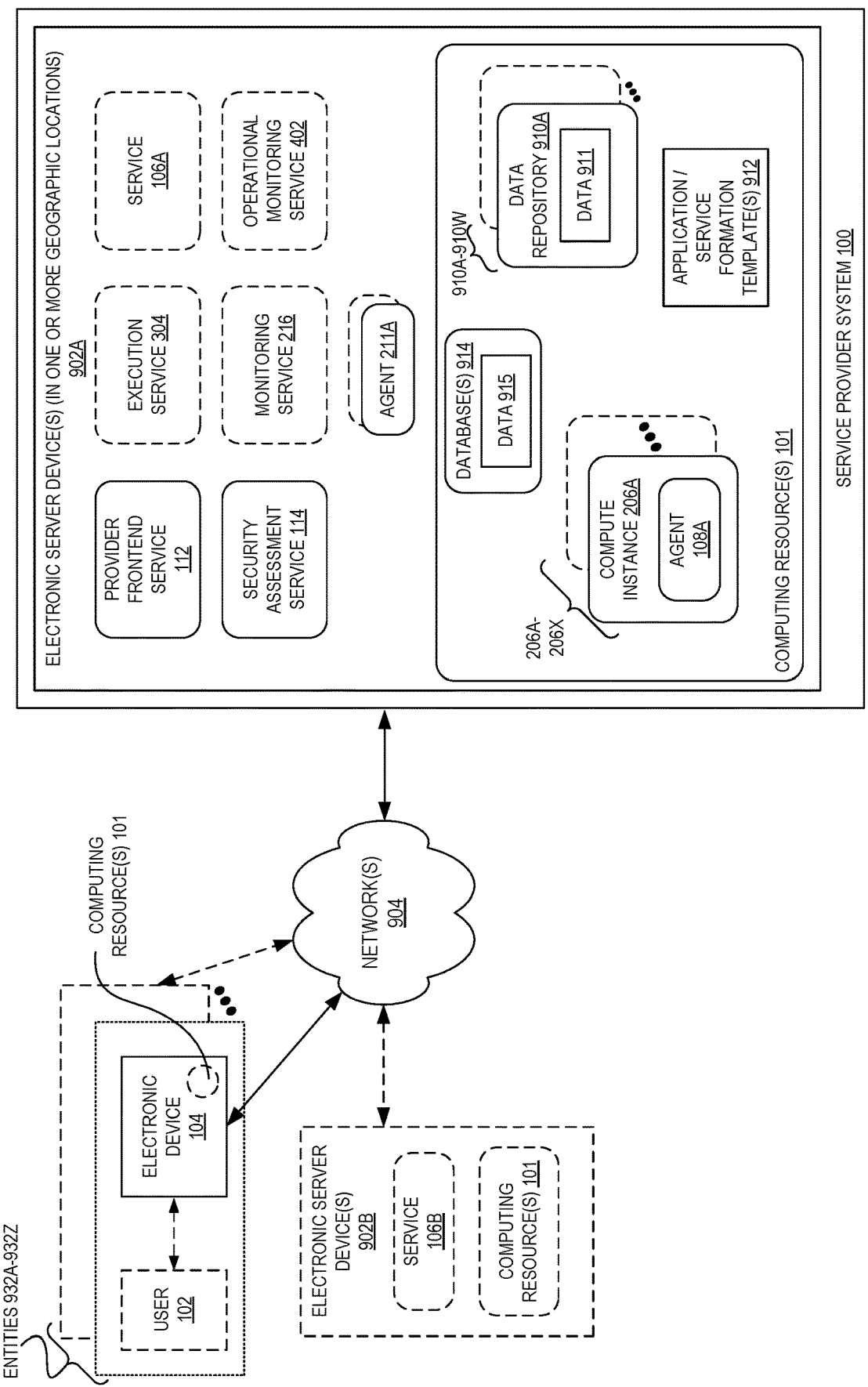
FIG. 9 is a block diagram illustrating example deployment implementations of components of a system implementing configurable event-based compute instance security assessments according to some embodiments.

FIG. 9 is a block diagram illustrating example deployment implementations of components of a system implementing configurable event-based compute instance security assessments according to some embodiments.

In some embodiments, the user 102 may be part of an entity 932A (e.g., an organization) and may operate an electronic device 104 of the entity 932A and/or within a network of the entity 932A. The electronic device 104 may be used to issue the configuration messages 150 described herein. The electronic device 104 may be an electronic client device (or electronic server device) described in additional detail later herein. The electronic device 104 may also implement one or more computing resources 101 that could be managed by the security assessment service 114.

The environment may further include one or more electronic server devices 902B that implement an external service 106B and/or one or more computing resources 101 that could be managed by the security assessment service 114. The one or more electronic server devices 902B may be within a network of entity 932A, or located in a different location and/or operate in a different network.

Devices of the entity 932A may connect via one or more public networks 904 (e.g., the Internet) to the service provider system 100. The service provider system 100 includes one or more electronic server devices 902A, which may be located in one or multiple geographic locations. The one or more electronic server devices 902A implement one or more software entities, including but not limited to the provider frontend service 112, security assessment service 114, monitoring service 216, execution service 304, service 106A, and/or operational monitoring service 402, and one or more agents 211A-211X.

The one or more electronic server devices 902A may also implement one or more computing resources 101, which may include one or more compute instances 206A-206Z (e.g., VMs, containers) that may execute one or more agents 208A-208N, one or more data repositories 910A-910W (e.g., buckets, folders, volumes, etc., as part of a data service) storing data 911, one or more application or service formation templates 912, one or more databases 914A storing data 915, etc.

Figure 10:
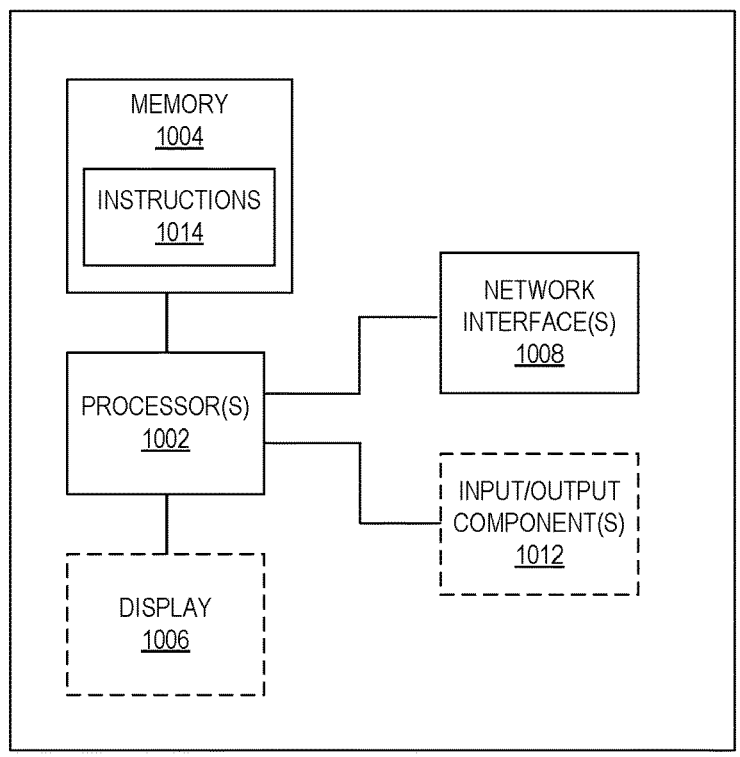
FIG. 10 illustrates a logical arrangement of a set of general components of an exemplary computing device that can be utilized in accordance with various embodiments.

FIG. 10 illustrates a logical arrangement of a set of general components of an example computing device 1000 such as electronic device 104, electronic server device(s) 902B, electronic server device(s) 902A, etc. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (e.g., instructions 1014) and/or data, and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1014) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
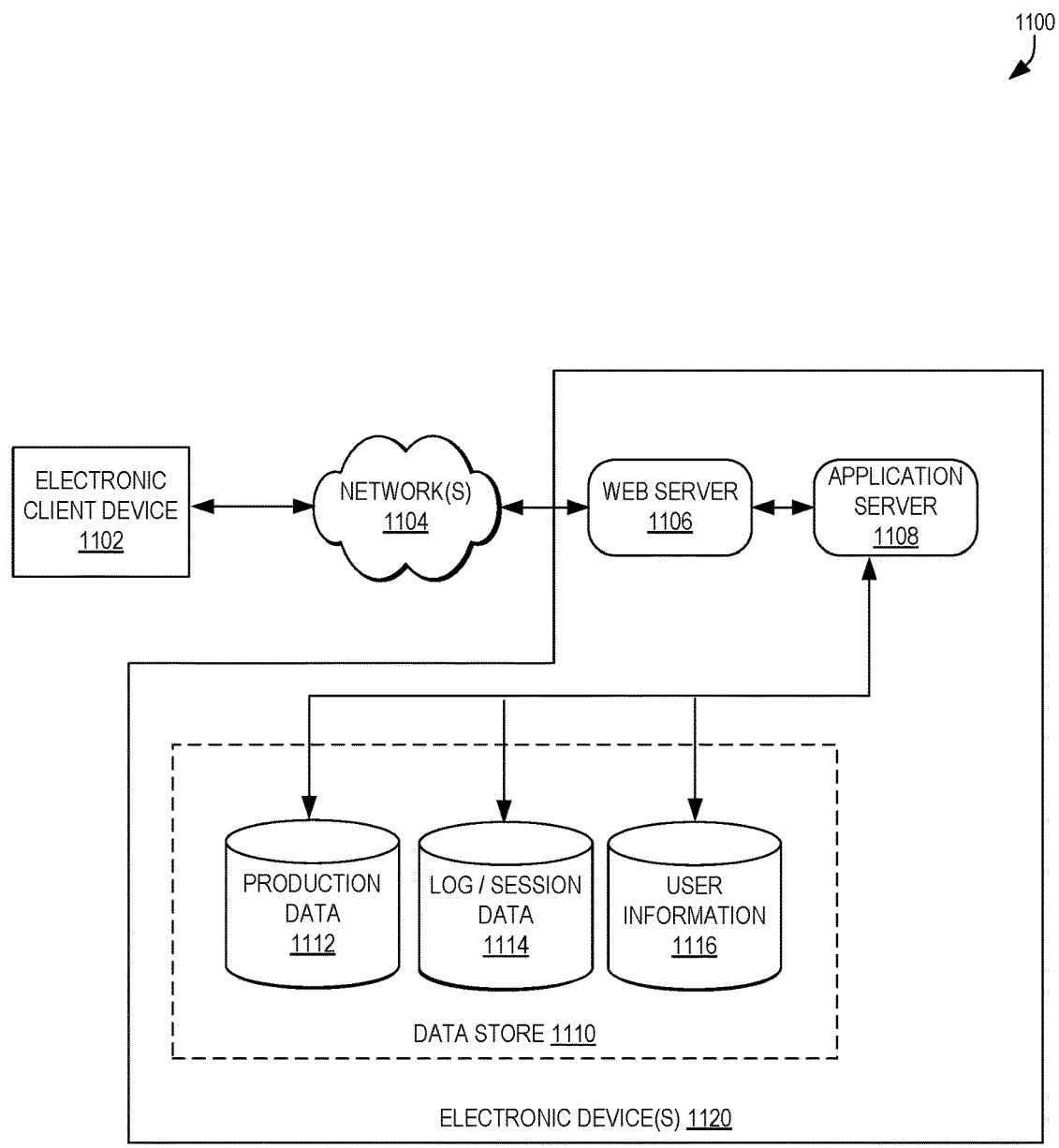
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments the one or more configuration messages 150 are HTTP requests that are received by a web server (e.g., web server 1106), and the users 102 via electronic devices 104 may interact with the service provider system 100 (e.g., to define and manage security assessment triggers and/or templates, etc.) via a web portal provided via the web server 1106 and application server 1108. As will be appreciated, although a web-based environment is used for purposes of explanation, different environments may be used, as appropriate, to implement various embodiments. The system includes an electronic client device 1102 (e.g., electronic device 104), which may also be referred to as a client end station and can be any appropriate device operable to send and receive requests, messages or information over an appropriate network 1104 (e.g., network(s) 904) and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HTML, Extensible Markup Language (XML), JSON, or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 210A-210M) may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving one or more configuration messages, sent on behalf of a user, indicating a request to perform a security assessment of one or more compute instances implemented by a service provider system responsive to any of a plurality of events being determined to have occurred involving at least one of the one or more compute instances, wherein the security assessment includes attempting to identify security vulnerabilities of the one or more compute instances;
   determining that at least one event of the plurality of events has occurred subsequent to event data being reported that is indicative of the at least one of the plurality of events, wherein determining that at least one event of the plurality of events has occurred comprises receiving, from a monitoring service of the service provider system, an event notification that identifies the at least one event, wherein a service within the service provider system provided the event data for the at least one event to the monitoring service responsive to the service interacting with at least one of the one or more compute instances; and
   performing the security assessment of the one or more compute instances responsive to the determining that the at least one event has occurred.

2. The computer-implemented method of claim 1, wherein performing the security assessment includes:
   sending one or more commands to one or more agents to cause the one or more agents to acquire security assessment data regarding a configuration characteristic or an operational characteristic of the one or more compute instances, wherein the one or more agents operate within the one or more compute instances or operate external to the one or more compute instances but within the service provider system.

3. The computer-implemented method of claim 1, further comprising:
sending an alarm configuration message to the monitoring service to request that the monitoring service send the event notification upon a condition being satisfied, wherein the condition is satisfied upon the monitoring service receiving the event data.

4. A computer-implemented method comprising:
receiving one or more configuration messages, sent on behalf of a user, indicating a request to perform a security assessment of one or more computing resources managed by a service provider system responsive to any of one or more events being determined to have occurred, wherein the security assessment includes attempting to identify security vulnerabilities of the one or more computing resources;
determining that an event of the one or more events has occurred subsequent to event data being reported that is indicative of the event, wherein determining that the event has occurred comprises receiving, from a monitoring service of the service provider system, an event notification that identifies the event, wherein a service within the service provider system provided the event data for the event to the monitoring service responsive to the service interacting with at least one of the one or more computing resources;
performing the security assessment of the one or more computing resources responsive to the determining that the event has occurred.

5. The computer-implemented method of claim 4, wherein the one or more computing resources comprise at least one of:
one or more compute instances;
one or more data repositories;
one or more database instances; or
an application template configured by the user to define an application that can be provisioned in the service provider system for the user, the application template identifying one or more other computing resources and configurations of the one or more other computing resources.

6. The computer-implemented method of claim 4, wherein the one or more computing resources comprise one or more compute instances, and wherein the event involved a change involving the one or more compute instances.

7. The computer-implemented method of claim 6, wherein the event is one of:
a process is created or terminated at the one or more compute instances;
a network connection is established to or from the one or more compute instances; or
a security configuration of the one or more compute instances is changed.

8. The computer-implemented method of claim 6, wherein performing the security assessment includes:
sending one or more commands to one or more agents to cause the one or more agents to acquire security assessment data regarding a configuration characteristic or an operational characteristic of the one or more compute instances, wherein the one or more agents operate within the one or more compute instances or operate external to the one or more compute instances but within the service provider system.

9. The computer-implemented method of claim 4, wherein the event comprises a new security vulnerability being published outside of the service provider system.

10. The computer-implemented method of claim 4, wherein the event comprises:
a new compute instance is launched or terminated for the user by a service of the service provider system responsive to a condition being met; or
an automated code deployment occurs to one or more compute instances of the user.

11. The computer-implemented method of claim 4, wherein:
the one or more computing resources comprise an application template configured by the user to define an application that can be provisioned in the service provider system for the user, the application template identifying one or more other computing resources and configurations of the one or more other computing resources; and
the security assessment includes attempting to identify any versions of computing resources identified within the application template that are known to have a security vulnerability.

12. The computer-implemented method of claim 4, wherein the one or more computing resources are located at a premises associated with the user that is outside of the service provider system.

13. A system comprising:
one or more computing resources implemented by a first set of one or more electronic devices; and
a security assessment service implemented by a second set of the one or more electronic devices, the security assessment service including instructions that upon execution cause the security assessment service to:
receive one or more configuration messages, sent on behalf of a user, indicating a request to perform a security assessment of the one or more computing resources responsive to any of one or more events being determined to have occurred, wherein the security assessment includes attempting to identify security vulnerabilities of the one or more computing resources;
determine that an event of the one or more events has occurred subsequent to event data being reported that is indicative of the event, wherein the security assessment service, as part of determining that the event has occurred, is to receive, from a monitoring service, an event notification that identifies the event, wherein a service within the service provider system provided the event data for the event to the monitoring service responsive to the service interacting with at least one of the one or more computing resources; and
perform the security assessment of the one or more computing resources responsive to the determination that the event has occurred.

14. The system of claim 13, wherein the one or more computing resources comprise at least one of:
one or more compute instances;
one or more data repositories; or
an application template configured by the user to define an application that can be provisioned for the user, the application template identifying one or more other computing resources and configurations of the one or more other computing resources.

15. The system of claim 13, wherein the one or more computing resources comprise one or more compute instances, and wherein the event involved a change involving the one or more compute instances.

16. The system of claim 15, wherein the event is one of:
- a process is created or terminated at the one or more compute instances;
- a network connection is established to or from the one or more compute instances; or
- a security configuration of the one or more compute instances is changed.

17. The system of claim 15, wherein the instructions further cause the security assessment service, as part of performing the security assessment, to:
- send one or more commands to one or more agents to cause the one or more agents to acquire security assessment data regarding a configuration characteristic or an operational characteristic of the one or more compute instances, wherein the one or more agents operate within the one or more compute instances or operate external to the one or more compute instances but within a same service provider system as the security assessment service.

* * * * *